Dec. 11, 1956  H. O. SCHJOLIN ET AL  2,773,552
DRIVE WHEEL AND BRAKE ASSEMBLY
Filed June 19, 1953  5 Sheets-Sheet 1

INVENTOR.
Hans O. Schjolin
Donald K. Isbell
BY
*John T. Martin*
Their Attorney

Dec. 11, 1956   H. O. SCHJOLIN ET AL   2,773,552
DRIVE WHEEL AND BRAKE ASSEMBLY
Filed June 19, 1953   5 Sheets-Sheet 2

INVENTOR.
Hans O. Schjolin
Donald K. Isbell
BY
John T. Martin
Their Attorney

Dec. 11, 1956 H. O. SCHJOLIN ET AL 2,773,552
DRIVE WHEEL AND BRAKE ASSEMBLY
Filed June 19, 1953 5 Sheets-Sheet 4

INVENTOR.
Hans O. Schjolin
Donald K. Isbell
BY
Their Attorney

Dec. 11, 1956   H. O. SCHJOLIN ET AL   2,773,552
DRIVE WHEEL AND BRAKE ASSEMBLY
Filed June 19, 1953   5 Sheets-Sheet 5

INVENTOR.
Hans O. Schjolin
Donald K. Isbell
BY
John T. Mann
Their Attorney.

United States Patent Office 2,773,552
Patented Dec. 11, 1956

2,773,552

DRIVE WHEEL AND BRAKE ASSEMBLY

Hans O. Schjolin, Birmingham, and Donald K. Isbell, Pontiac, Mich., assignors to General Motors Corporation, Detroit, Mich., a corporation of Delaware Application June 19, 1953, Serial No. 362,874

9 Claims. (Cl. 180—75)

This invention relates to a wheel structure for an automotive vehicle.

One of the disadvantages of currently used wheel structures is that all service operations on the brakes and brake drums either require removal of the wheel from the automotive vehicle or the service operations must be performed from the inside of the wheel. This is true even for minor brake adjustments.

It is therefore an object of this invention to provide an improved wheel structure wherein all service operations on the brake and the wheel can be performed on the structure from the outside of the wheel.

It is also an object of the invention to provide a wheel structure wherein service operations can be performed upon the brake without requiring removal of the wheel from the vehicle.

In accomplishing the foregoing objects it is therefore an object of the invention to arrange the brake drum for the wheel of an automotive vehicle on the exterior side of the wheel as well as mount the brake assembly on the exterior side of the wheel for easy removal and reinstallation.

It is also an object of the invention to provide an improved mounting of a brake drum on a wheel whereby a plurality of seats is provided on the brake drum and on the wheel which cooperate to coaxially align the drum relative to the axis of the wheel.

It is still a further object of the invention to provide an improved wheel structure whereby air is forcefully circulated by fan shaped wheel spokes through the brake drum and over the braking surface for rapid dissipation of heat developed resulting from braking.

It is another object of the invention to provide an improved wheel structure wherein the complete brake assembly, the wheel and the axle for the wheel are all removable from the exterior side of the wheel with the wheel and the brake assembly being carried by the axle housing for separate and independent removal.

Further objects and advantages of the present invention will be apparent from the following description, reference being had to the accompanying drawings wherein a preferred form of the invention is clearly shown.

Figure 1:
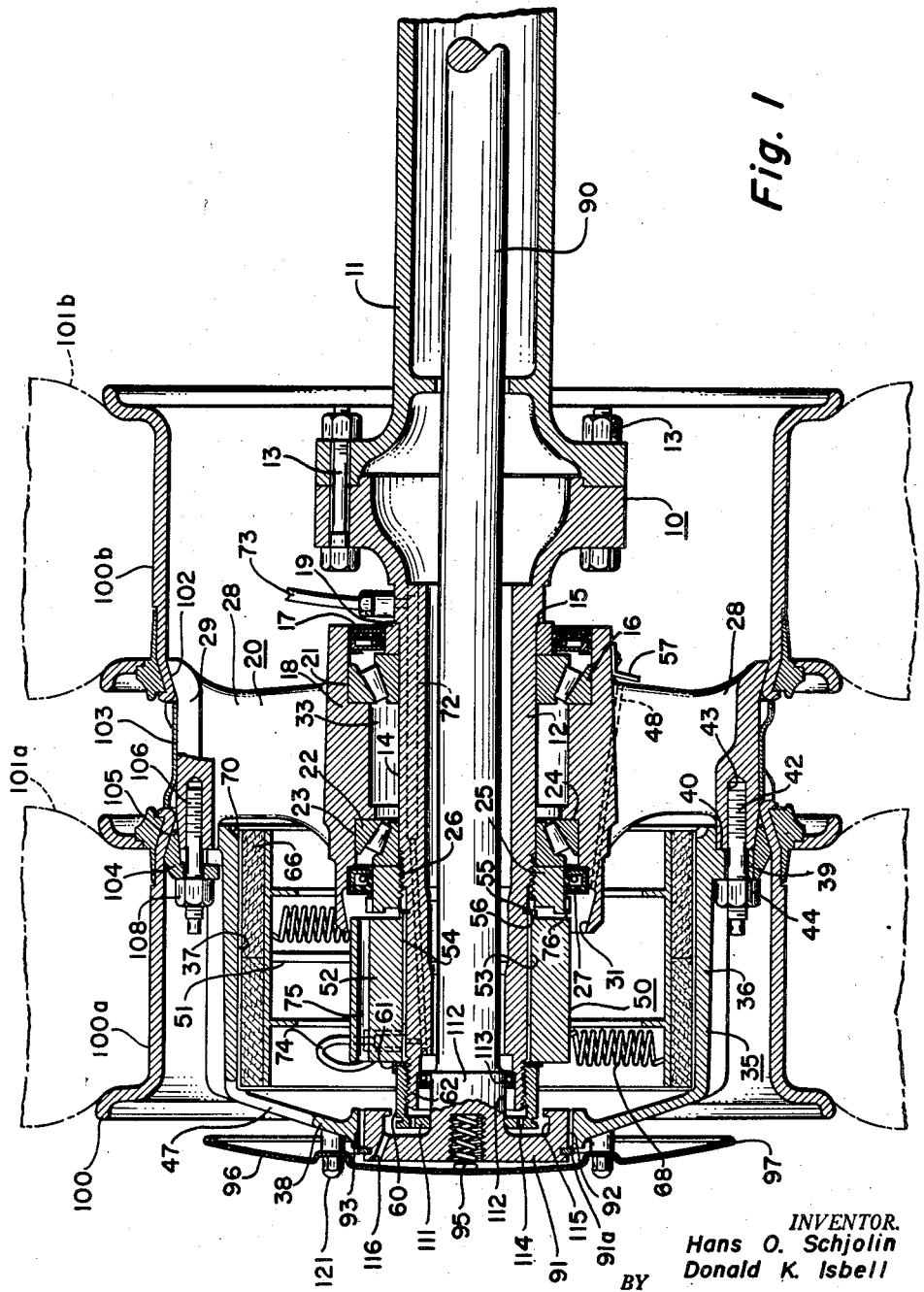
Figure 1 is a transverse cross sectional view of a wheel structure incorporating features of this invention taken substantially along line 1—1 of Figure 2.
Figure 2:
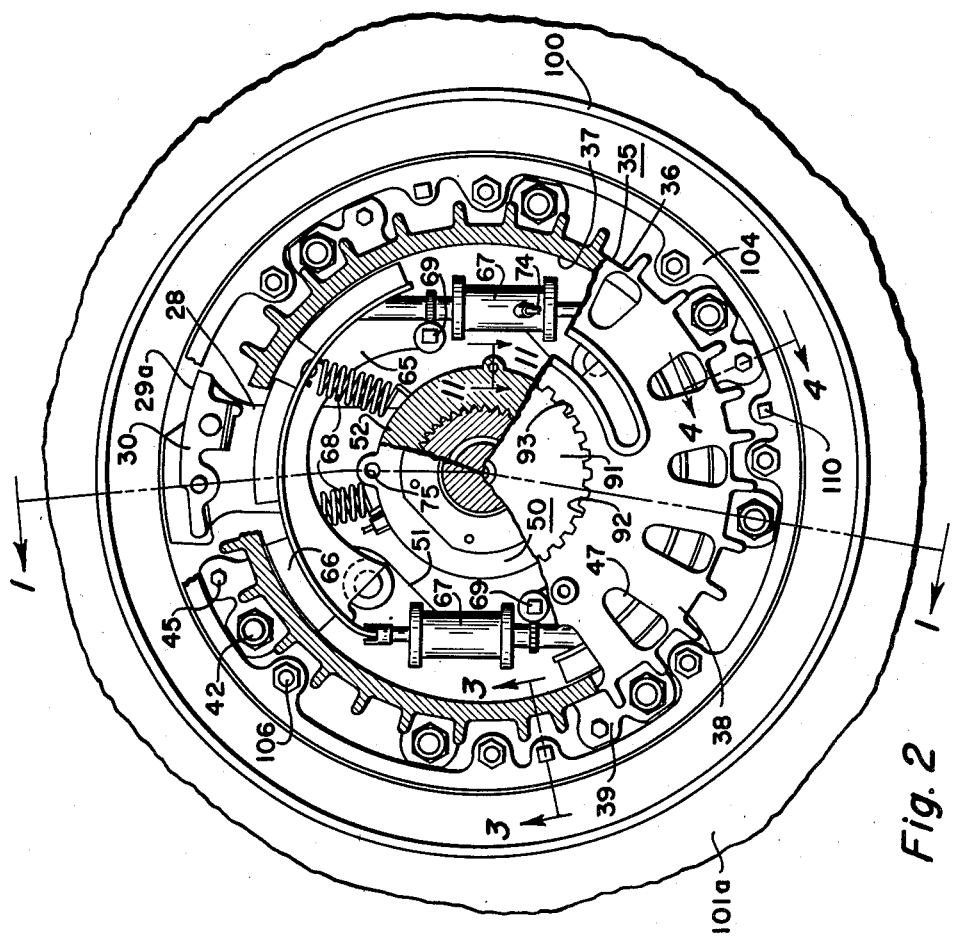
Figure 2 is a side view of the wheel and brake assembly partially in elevation and partially in cross section to illustrate the several structures of the mechanism.

In this invention the wheel structure includes an axle housing 10 that includes a housing part 11 integral with the differential housing of an automotive vehicle and a housing part 12 that is attached to the housing part 11 by the bolts 13. The axle housing 10 and specifically the housing part 12 supports the wheel structure hereinafter described.

The axle housing 12 has a reduced diameter portion 14 forming a smooth cylinder with a shoulder 15 at one end thereof.

A wheel bearing 16 is placed upon the cylindrical portion 14 with a grease seal 17 positioned at the end thereof and encircling a spacer ring 19. A wheel 20 having a hub 18 is supported by the wheel bearing 16, the wheel bearing and the grease seal 17 being positioned within a recess 21 provided in one end of the wheel hub 18.

At the opposite end of the wheel hub 18 there is provided a second wheel bearing 22 that is supported upon the cylindrical portion 14 of the axle housing 10. The wheel bearing 22 is received within a recess 23 provided in the forward end of the hub 18, the bearing 22 resting against a shoulder 24 formed by the recess 23.

A bearing adjusting nut 25 is threadedly received on the threaded portion 26 at the forward end of the cylindrical portion 14 of the axle housing 10. The adjusting nut 25 bears against the wheel bearing 22 which in turn bears against the hub 18 and it in turn against the wheel bearing 21 to urge the spacer ring 19 against the shoulder 15 of the axle housing 10 whereby to provide the desired bearing adjustment in the wheel bearings 22 and 21.

The wheel hub 18 has a chamber 33 that receives lubricant through a suitable "Alemite" or other type grease fitting to provide for lubrication of the wheel bearings 22 and 21. A suitable grease relief is provided from the chamber 33 to avoid overloading the bearings 21 and 22 and forcing grease past the grease seals 17 and 27, the grease seal 27 being provided around the bearing adjusting nut 25 at the forward end of the hub 18. The forward end of the hub 18 has an angularly disposed wall 31 forming a cone shaped chamber which provides a grease trap for leakage through the grease seal 27. A passage 48 extends from the grease trap 31 radially outwardly of the axis of the wheel so that grease leaking through the seal 27 will be thrown outwardly of the grease trap through the passage 48 by centrifugal force. A dirt shield 57 is provided at the end of the passage 48.

The wheel 20, which includes the hub 18, also includes a supporting structure comprising a plurality of individual spokes 28 that form a spider structure between the hub 18 and the rim portion 29 of the wheel 20.

Figure 7:
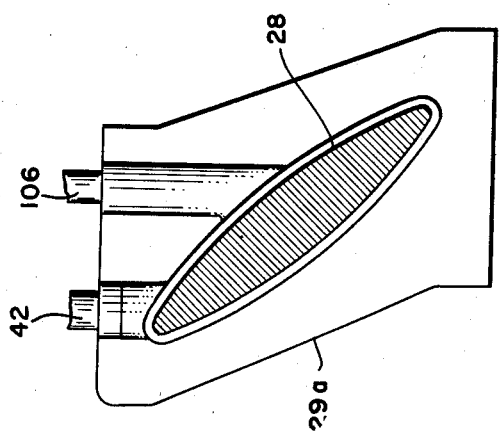
Figure 7 is a transverse cross sectional view of one of the spokes of the wheel spider taken on line 7—7 of Figure 5.
Figure 9:
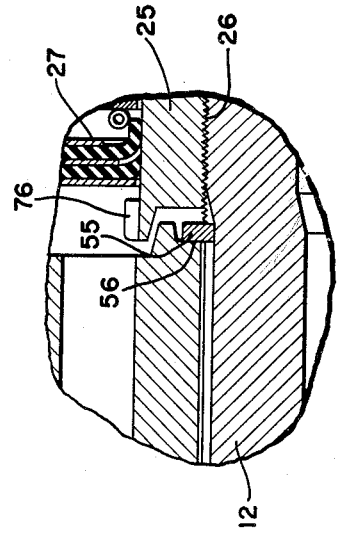
Figure 9 is an enlarged cross sectional view of the portion of the structure of Figure 1 illustrating the mounting structure between the brake assembly and the bearing assembly for the wheel.
Figure 8:
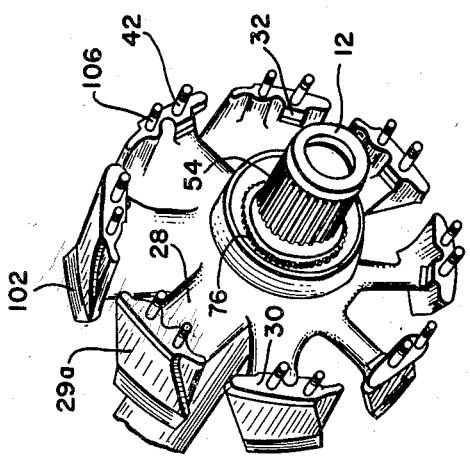
Figure 8 is a perspective elevational view of the wheel spider illustrating the fan shaped arrangement of the spokes.
Figure 11:
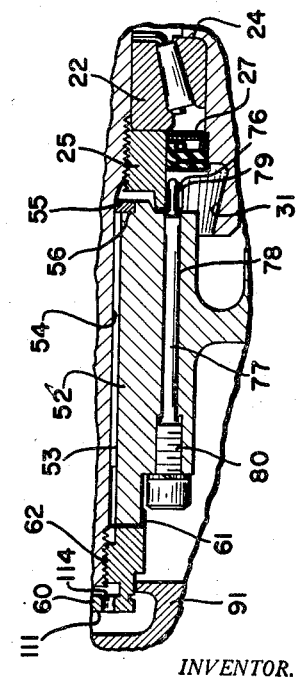
Figure 11 is a cross sectional view taken along line 11—11 of Figure 2 illustrating the locking pin for the wheel bearing adjustment nut.

As illustrated in Figures 7 and 8, the spokes 28 of the wheel spider are positioned angular relative to the axis of the wheel to provide a fan arrangement. This fan arrangement of the wheel spider creates a forced air motion through the brake drum and over the brake assembly in a manner hereinafter described.

The rim portion 29 of the wheel 20 is formed by the end portions of the spider spokes 28, and as illustrated in Figure 8 the rim portion 29 comprises a plurality of segments 29a each carried on the end of a spider spoke 28.

Each of the rim portions 29a has the forward face 30 thereof finished with all of the faces 30 being in a common plane normal to the axis of the wheel 20. The faces 30 form a seat or pad upon which a brake drum is mounted hereinafter described. Coextensive with each of the faces 30 on the rim portions 29a there is provided a finished recessed portion 32 that forms a right angle with the face 30. The cooperation of the face 30 and the recess 32 forms an angular seat or angular seat pad that is engaged by cooperating surfaces on a brake drum to coaxially align the brake drum with the axis of the wheel.

A brake drum 35 is removably secured to the rim portion 29 of the wheel 20. The brake drum 35 comprises a cylindrical portion 36 that is positioned concentric with the axis of the wheel and has a braking surface 37 on the inner periphery thereof. The brake drum 35 also includes a wall 38 that closes the outer end of the brake drum 35. The opposite inner end of the brake drum 35 is open and is positioned against the wheel spider comprising the spokes 28.

Figure 10:
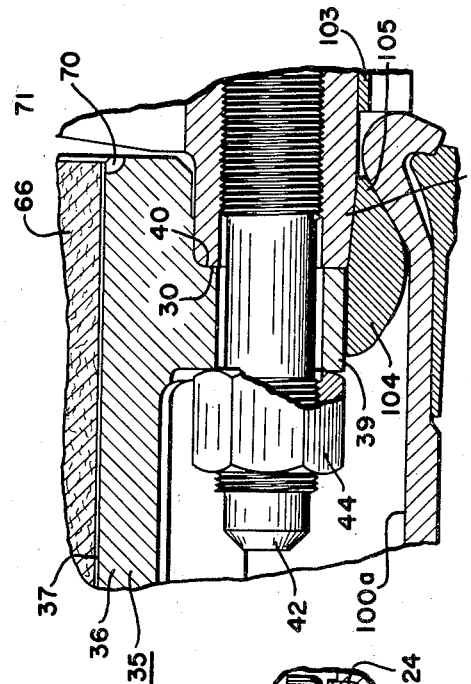
Figure 10 is a cross sectional view of a portion of Figure 1 illustrating the structure for mounting the brake drum on the wheel spider.

The brake drum 35 has a plurality of radially extending flange portions or lugs 39 that project from the outer periphery of the brake drum 35. These flange portions or lugs 39 have the forward face 40 thereof finished normal to the axis of the brake drum 35 to engage and cooperate with the face 30 on the forward edge of the rim portions 29a, as shown in Figure 10. Coextensive with the surface 40 on the brake drum 35 there is provided a finished surface 41 forming a peripheral ring around the outer peripheral edge of the brake drum 35. This ring surface 41 is at a right angle to the surface 40 and cooperates with the surface 32 on the rim portions 29a, as illustrated in Figure 10, whereby the right angle seat pads formed by the surface 30 and 32 on the rim portions 29a and by the surface portions 40 and 41 on the brake drum 35 cooperate to coaxially align the brake drum with the axis of the wheel 20.

Mounting studs 42 extend through the seat pads hereinbefore described with one end thereof in threaded engagement with a threaded bore 43 provided in the mounting pads formed by the rim segments 29a. The outer end of the mounting stud 42 receives a nut 44 to secure the brake drum 35 upon the rim segments 29a.

Figure 6:
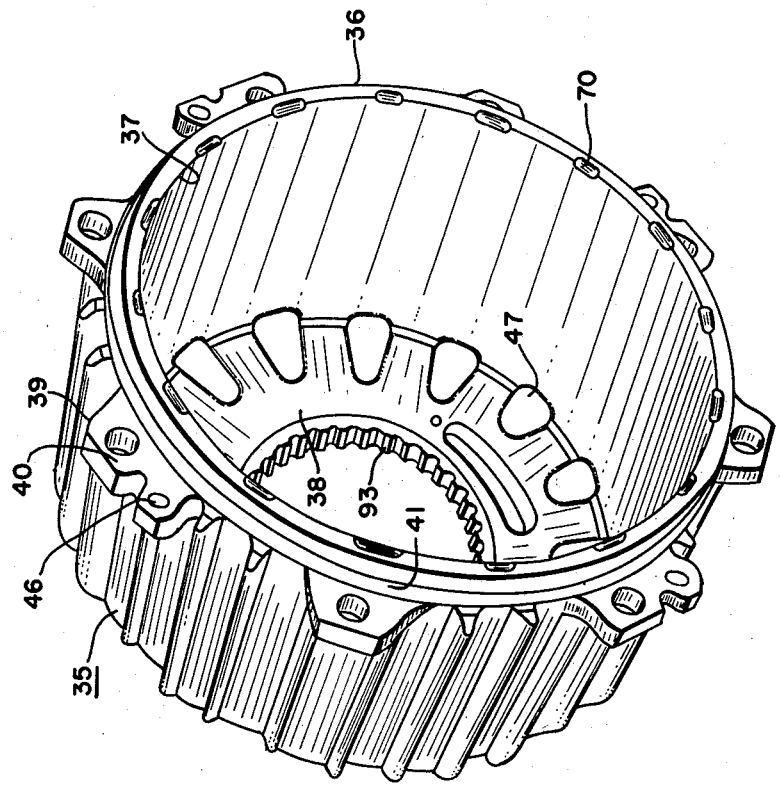
Figure 6 is a perspective elevational view of the brake drum.

To provide for dismounting of the brake drum 35 from the rim portion 29 of the wheel 20, certain of the flange portions 39 on the brake drum 35 are provided with a release bolt 45 that is threadedly received within a threaded hole 46 provided in the certain flange portions 39 as illustrated in Figure 6. The release studs 45 are adapted to engage the seat pad surface 30 on the rim portions 29a to cause the brake drum 35 to be moved away from the rim portions 29a when the drum is to be dismounted.

The brake drum 35 has a plurality of openings 47 in the wall 38 to provide for circulation of air through the brake drum as induced by the fan blades formed by the wheel spokes 28 upon rotation of the wheel.

A brake assembly 50 is secured on the axle housing 12 between the wheel hub 18 and the projecting end of the axle housing 12. The brake assembly 50 includes a brake spider 51 having a hub portion 52. The hub 52 of the brake spider has an internal spline 53 that is received upon an external spline 54 provided on the axle housing 12. A stop ring 55 is received on the spline 54 on the axle housing 12 and is retained in a recess 56 in the inner end of the brake spider hub 52 to limit the movement of the brake spider 52 upon the axle housing 12. The stop ring 55 rests against the forward edge of the threaded portion 26 on the axle housing 12, and prevents damage to the forward edge of the threaded portion.

The brake spider including the hub 52 thereof is retained upon the spline portion 54 of the axle housing 12 by means of a retaining nut 60 and a washer 61, the retaining nut 60 being threadedly received on the threaded end 62 of the axle housing 12.

The brake assembly 50 includes a plurality of brake shoes 65 having suitable brake lining 66 thereon. The brake shoes are urged outwardly against the brake drum 35 by means of the hydraulic wheel cylinder 67, and are retained in their retracted position by means of the springs 68. Suitable adjusting devices 69 are provided to maintain brake adjustment.

The braking surface 37 on the inner periphery of the drum 35 is substantially the same width as that of the brake linings 66. However, at each edge of the brake surface 37 on the drum 35 there is provided a plurality of recessed portions or pockets 70 that have their inner edges initiating inwardly of the outer edge periphery of the brake surface 37, as illustrated in Figures 1 and 10. Thus the brake linings 66 overlap the inner peripheral edge 71 of the pockets or recesses 70 so that any foreign material between the brake linings 66 and the brake surface 37 on the drum 35 can work its way free of the drum and be discharged through the pockets or recesses 70. This avoids development of ridges in the brake surface 37 of the brake drum at the edge periphery of the brake linings 66.

As will be noted in Figure 1 forced circulation of air is provided through the brake drum 35 by the fan blades formed by the spider spokes 28 of the wheel 20, the forced air circulation being conducted across the brake shoes 65 to increase the dissipation of heat developed during braking.

The wheel cylinders 67 of the brake assembly 50 are supplied with hydraulic fluid through the passage 72 provided in the axle housing 12. One end of the passage 72 is connected with the brake line 73 connected with the master cylinder of the brake system while the opposite end of the passage 72 connects with a conduit 74 that carries the brake fluid to the wheel cylinders 67.

The hub 52 of the brake spider has a passage 75 therein that has the periphery thereof aligned with a gear ring 76 provided around the adjusting nut 25, the teeth of the gear ring being formed integral with the adjusting nut 25. Thus, a wrench with a pinion on the end thereof can be inserted through the passage 75 to engage the pinion with the gear ring 76 to rotate the adjusting nut 25 on the threaded portion 26 of the axle housing 12 to adjust the axle bearings 21 and 22 without removal of the brake assembly 50. To prevent rotation of the adjusting nut 25 after adjustment of the bearings 21 and 22, a locking pin 77 is positioned in a bore 78 in the hub 52 of the brake spider. One end of the locking pin 77 has a reduced diameter portion 79 that engages between adjacent teeth of the gear ring 76. The opposite end of the locking pin 77 is threadedly received in a threaded portion 80 of the bore 78 to secure the pin within the hub 52 of the brake spider.

A driving axle 90 extends from the differential of the automative vehicle through the axle housing 10 and projects from the outer end of the axle housing portion 12. The axle 90 has an enlarged head 91 provided with a spline 92 on the periphery thereof. The spline 92 engages a corresponding spline 93 provided in a central opening in the wall 38 of the brake drum 35. The axle 90 therefore drives the wheel 20 through the splined connection between the axle and the brake drum and thence through the brake drum 35.

The axle 90 is resiliently urged inwardly toward the differential of the automotive vehicle by a resilient spring member 95 that is placed between the axle 90 and a cover plate 96 secured to the wall 38 of the brake drum 35, the cover plate 96 enclosing the enlarged head 91 of the axle 90 and also forming a hub cap for the wheel 20. A snap ring 91a engages the drum wall 38 to limit inward movement of the axle 90. The outer peripheral edge 97 of the plate or hub cap 96 is in spatial relationship with the tire rim 100 mounted on the rim portion 29 of the wheel 20.

The tire rim 100 includes two parts 100a and 100b each of which receives a tire 101a and 101b. The rim part 100b has one edge engaging an angular portion 102 on the rim segments 29a. A spacer member 103 is placed between the rim part 100b and the rim part 100a. A rim ring 104 having a wedge shaped nose 105 retains the rim part 100a upon the wheel rim segments 29a.

A plurality of studs 106 extend from the seat pads 30 of the wheel rim segments 29a through the rim ring 104, suitable nuts 108 being provided on the studs 106 to secure the rim ring 104 upon the wheel 20.

Figures 3, 4:
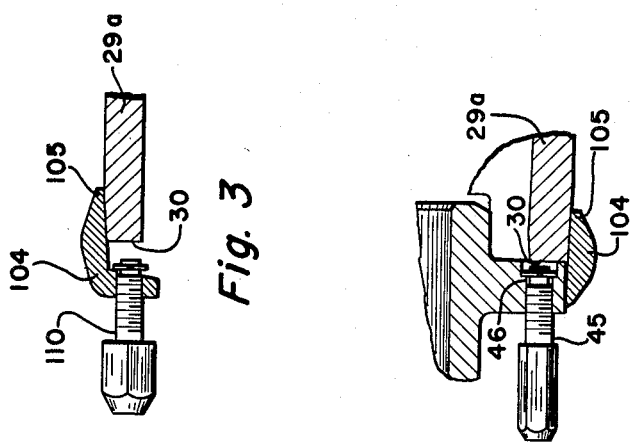
Figure 3 is cross sectional view taken along line 3—3 of Figure 2.
Figure 4 is a cross sectional view taken along line 4—4 of Figure 2.

To dismount the rim ring 104 from the wheel 20 there is provided a plurality of studs 110 threadedly received in the rim ring 104 as illustrated in Figure 3. Rotation of the studs 110 within the threaded openings in the rim ring 104 causes engagement of the stud with the face 30 of the seat pads on the wheel rim portions 29a to force the rim ring 104 out of engagement with the wheel rim segments 29a, to provide for dismounting of the tire rims 100a and 100b.

A retaining nut 60 that secures the brake assembly 50 on the end of the axle housing 12 has a radially extending wall 111 that is in close proximity to an enlarged cylindrical portion 112 on the forward end of the axle shaft 90. This wall 111 provides support for the axle shaft 90 during removal of the shaft from the axle housing 12. A grease seal 113 is provided between the axle housing 12 and the cylindrical portion 112 of the axle 90 to prevent grease flow from the differential of the automotive vehicle. Any grease leaking past the seal 113 passes through the openings 114 in the wall 111 and then is thrown into the grease trap 115 in the enlarged head 91 on the end of the shaft 90. A passage 116 provides for discharge of grease thrown into the grease trap 115.

Figure 5:
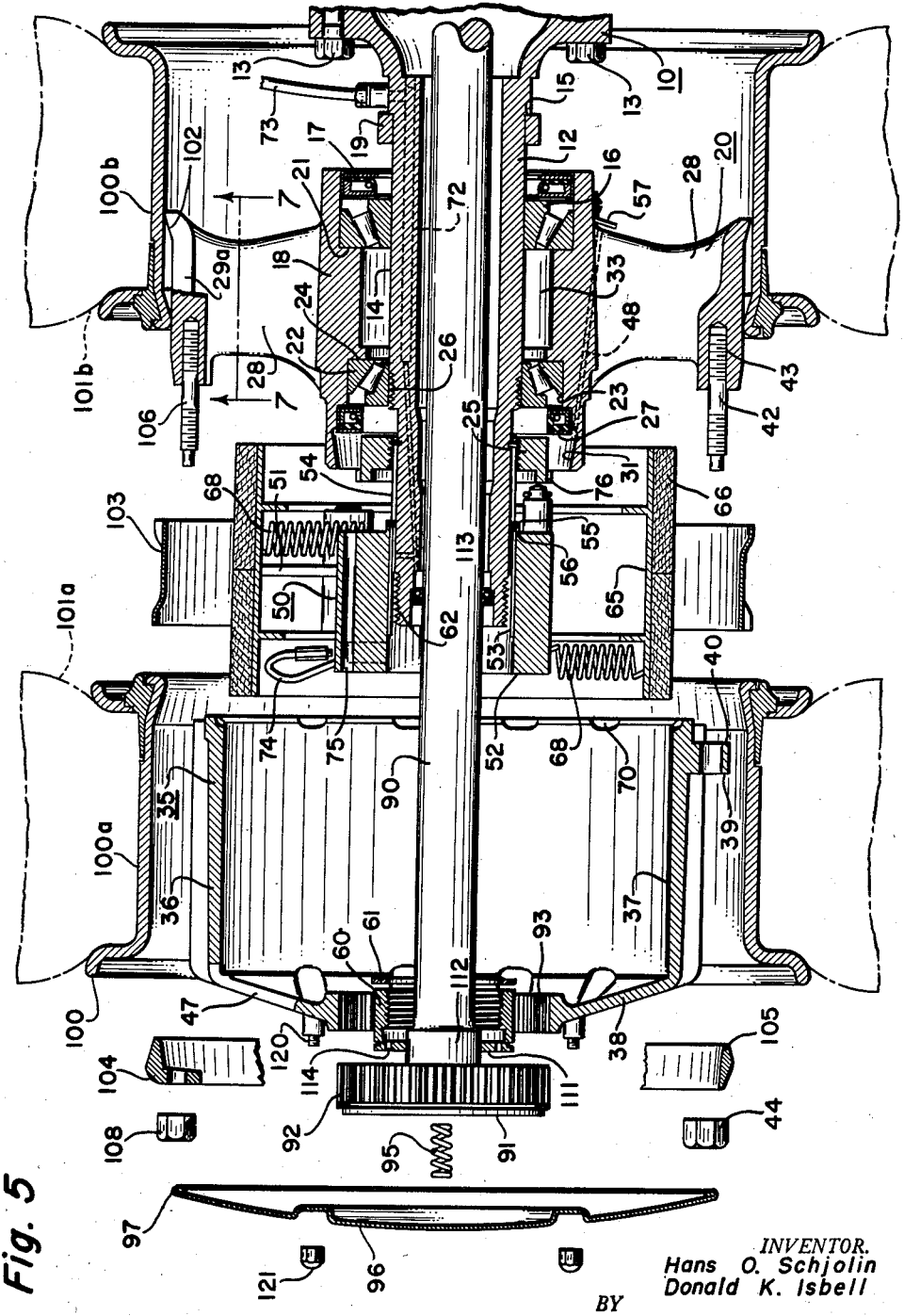
Figure 5 is a transverse cross sectional view similar to Figure 1 but illustrating the several parts of the mechanism arranged in their order of assembly.

In Figure 5 there is illustrated an exploded view of the several parts of the wheel structure heretofore described arranged in the order in which they are assembled on the axle housing 12. As illustrated, the spacer ring 19 is first placed upon the axle housing 12. The wheel 20 including the wheel bearings 21, 22 and the grease seals 17 and 25 is then placed upon the cylindrical portion 14 of the axle housing 12. This assembly is retained in position by threading of the adjusting nut 25 upon the threaded portion 26 of the axle housing 12.

The brake assembly 50 is then placed upon the axle housing 12 with the internal spline 53 in the hub 52 of the brake assembly engaging the external spline 54 on the forward end of the axle housing 12. The retaining nut 60 and washer 61 are then placed upon the threaded portion 62 on the end of the axle housing to retain the brake assembly 50 on the axle housing. The brake drum 35 is then placed around the brake assembly and secured in position upon the studs 42, the nut 44 being provided for this purpose.

After assembly of the brake drum 35 the axle 90 is inserted through the axle housing 12 with the splined head 91 of the axle 90 in engagement with the spline 92 in the brake drum 35. The cover plate 96 is then placed upon the brake drum 35 and secured thereto by the studs 120 and the nuts 121, the spring 95 being positioned between the cover plate 96 and the head 91 of the axle 90.

The tire rim 100b is then placed upon the wheel rim segments 29a followed by the spacer 103 and the tire rim part 100a. This assembly is followed by placement of the rim ring 104 upon the segments 29a with the studs 106 extending through the rim ring and the nuts 108 securing the rim ring in position.

It will be readily appreciated from the foregoing description that the axle shaft 90, the brake drum, the brake assembly 50, and the wheel assembly 20 can all be dismantled from the axle housing 12 from the exterior side of the wheel to provide for ease of repair and reassembly.

While the form of embodiment of the invention as herein disclosed constitutes a preferred form, it is to be understood that other forms might be adopted as may come within the scope of the claims which follow.

What is claimed is as follows:

1. In a wheel structure for an automotive vehicle, the combination of; an axle housing; a wheel comprising a hub journaled on said housing, a segmented rim portion, and a supporting spoke structure connecting said hub and the segments of said rim portion; a brake assembly splined on said housing between said hub and the outer end of said housing; a brake drum encircling said brake assembly and having a wall closing the outer side thereof; the inner side of said drum being open and having flange segments projecting radially of the drum at the peripheral edge of the open side thereof and a continuously extending peripheral surface forming therewith angular seat means; each of said rim portion segments having cooperating angular seat means thereon engaged by the aforesaid angular seat means to thereby coaxially align said drum with the wheel axis; and an axle extending through said housing and drivingly engaging said drum wall to drive said wheel therethrough.

2. A wheel structure in accordance with claim 1 wherein the angular seat means on said drum and on said rim portion is right angular seat means.

3. A wheel structure in accordance with claim 1 wherein the angular seat means on said drum comprises a plurality of individual seat pads and the cooperating angular seat means on the rim portion also comprises a plurality of individual seat pads, the seat pads on said drum engaging the seat pads on the rim portion for alignment of the drum with the wheel axis.

4. A wheel structure in accordance with claim 1 wherein the angular seat means on said drum comprises a plurality of individual seat pads and the cooperating angular seat means on the rim portion also comprises a plurality of individual seat pads, the seat pads on said drum engaging the seat pads on the rim portion for alignment of the drum with the wheel axis, and fastening lugs extending through the seat pads on said drum and said rim portion to secure said drum on said rim portion.

5. In a wheel structure for an automotive vehicle, the combination of; a hollow axle housing; a wheel comprising a hub journaled on said housing, a segmented rim portion, and a spider structure connecting said hub with the segments of said rim portion; said spider structure comprising a plurality of individual spokes with a rim segment thereon having angular seat pads on one of the ends thereof; anti-friction bearing means between said hub and housing supporting the hub on the housing; adjustable nut means on said housing engaging said bearing means to retain the same and said hub on the housing; a brake assembly splined on said housing between said nut means and the outer end of said housing; nut means on the end of said housing retaining said brake means on the housing; a brake drum encircling said brake assembly and having a wall closing the outer side thereof; the inner side of said drum being open and having a plurality of radially projecting lugs thereon at the peripheral edge of the open side of the drum, said lugs and the outer periphery of said drum at the said edge forming a plurality of angular seat pads engageable with the seat pads on said rim segments to coaxially align said drum with the wheel axis; fastening means extending through said seat pads to secure said drum on said spider; and an axle extending through said housing and drivingly engaging said drum wall through spline means to drive said wheel therethrough.

6. A wheel structure in accordance with claim 5 in which said lugs on said drum carry movable release means for movement into engagement with said pads on said spider to forcefully move said drum relative to said spider to remove the same therefrom.

7. A wheel structure in accordance with claim 5 that includes a tire rim supported on said rim segments, a rim ring engaging said tire rim and said segments to secure said tire rim on said segments, and a plurality of rim mounting bolts extending through said rim ring and the said pads on said segments.

8. A wheel structure in accordance with claim 5 that includes a tire rim supported on said rim segments, a rim ring engaging said tire rim and said segments to secure said tire rim on said segments, and a plurality of release bolt means on said rim ring adjacent said rim mounting bolts for engaging said pads on said segments to release said rim ring therefrom.

9. In a wheel structure for an automotive vehicle, the combination of; an axle housing; a wheel comprising a hub journaled on said housing, a rim portion, and a spider comprising a plurality of individual spokes connecting said hub and said rim portion; a brake assembly secured on said housing between said hub and the outer end of said housing; a brake drum encircling said brake assembly and having a wall closing one side thereof, the other side of said drum being open and having the edge periphery thereof engaging said spider for mounting of said drum on said spider, said drum wall having a plurality of openings therein, said spokes of said spider being formed as air circulating blades to forcefully circulate air through said brake and said drum.

References Cited in the file of this patent

UNITED STATES PATENTS

| | | |
|---|---|---|
| 1,670,000 | Perrot | May 15, 1928 |
| 1,865,312 | Goostray | June 28, 1932 |
| 1,908,024 | Keller | May 9, 1933 |
| 1,974,905 | Walker | Sept. 25, 1934 |
| 1,994,719 | Lichty | Mar. 19, 1935 |
| 2,123,614 | Sinclair | July 12, 1938 |
| 2,161,904 | Sinclair | June 13, 1939 |
| 2,231,207 | Baker | Feb. 11, 1941 |
| 2,599,013 | Pringle | June 3, 1952 |
| 2,649,922 | Hutchinson et al. | Aug. 25, 1953 |
| 2,661,819 | Strohm | Dec. 8, 1953 |

FOREIGN PATENTS

| | | |
|---|---|---|
| 367,435 | France | Sept. 1, 1906 |
| 613,340 | Great Britain | Nov. 25, 1948 |